(12) United States Patent
Maeda

(10) Patent No.: US 10,758,827 B2
(45) Date of Patent: *Sep. 1, 2020

(54) IN-GAME INCENTIVE GRANTING DEVICE AND PROGRAM FOR INCENTIVE GRANTING

(71) Applicant: Pokelabo, Inc., Tokyo (JP)

(72) Inventor: Yuta Maeda, Tokyo (JP)

(73) Assignee: Pokelabo, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/351,013

(22) Filed: Mar. 12, 2019

(65) Prior Publication Data

US 2019/0201792 A1 Jul. 4, 2019

Related U.S. Application Data

(63) Continuation of application No. 15/225,367, filed on Aug. 1, 2016, now Pat. No. 10,272,339, which is a (Continued)

(30) Foreign Application Priority Data

Dec. 27, 2012 (JP) ................ 2012-284152

(51) Int. Cl.
*A63F 9/24* (2006.01)
*A63F 13/61* (2014.01)
(Continued)

(52) U.S. Cl.
CPC ............. *A63F 13/61* (2014.09); *A63F 13/10* (2013.01); *A63F 13/12* (2013.01); *A63F 13/30* (2014.09);
(Continued)

(58) Field of Classification Search
CPC .... G07F 17/3288; G07F 17/32; G07F 17/326; G07F 17/38; G07F 17/3267;
(Continued)

(56) References Cited

U.S. PATENT DOCUMENTS

2002/0082920 A1 6/2002 Austin et al.
2006/0148567 A1 7/2006 Kellerman et al.
(Continued)

FOREIGN PATENT DOCUMENTS

CN 102024293 A 4/2011
JP 2009-011831 A 1/2009
(Continued)

OTHER PUBLICATIONS

Office Action dated Dec. 15, 2015, issued in Korean Application No. 10-2015-7015439 (English translation).
(Continued)

*Primary Examiner* — Justin L Myhr
(74) *Attorney, Agent, or Firm* — Pillsbury Winthrop Shaw Pittman, LLP

(57) ABSTRACT

Provided is an incentive granting device, comprising: a second game notifying unit 16 which notifies an existing user of the existence of a second game during the execution by the existing user of a first game app; an introduction code issuing unit 18 which issues an introduction code during the execution of the second game app by the existing user who has received the notification; and an incentive granting unit 20 which grants a prescribed incentive for the existing user's first game, with respect to a new user receiving an introduction from the existing user and downloading the second game app. By allowing an existing user to be aware of the existence of a second game during the execution of a first game, and to obtain an incentive for the first game by executing the second game and introducing a new user
(Continued)

| EXISTING USER ID | INTRODUCTION CODE | NEW USER ID |
|---|---|---|
| U0001 | IV0001 | U3597 |
| | | U2393 |
| | | U0104 |
| | | U1054 |
| U0002 | --- --- --- | --- --- --- |
| U0003 | IV0002 | --- --- --- | thereto, the existing user is given a motivation to proactively spread the word about the second game.

9 Claims, 5 Drawing Sheets

Related U.S. Application Data continuation of application No. 14/655,917, filed as application No. PCT/JP2013/078780 on Oct. 24, 2013, now Pat. No. 9,440,149.

(51) Int. Cl.
- *A63F 13/34* (2014.01)
- *A63F 13/335* (2014.01)
- *A63F 13/79* (2014.01)
- *A63F 13/69* (2014.01)
- *A63F 13/533* (2014.01)
- *G07F 17/32* (2006.01)
- *A63F 13/30* (2014.01)
- *A63F 13/73* (2014.01)
- *G06Q 30/02* (2012.01)
- *A63F 13/40* (2014.01)

(52) U.S. Cl.
CPC ............ *A63F 13/335* (2014.09); *A63F 13/34* (2014.09); *A63F 13/533* (2014.09); *A63F 13/69* (2014.09); *A63F 13/73* (2014.09); *A63F 13/79* (2014.09); *G06Q 30/0209* (2013.01); *G07F 17/32* (2013.01); *G07F 17/3244* (2013.01); *G07F 17/3255* (2013.01); *G07F 17/3267* (2013.01); *A63F 2300/5506* (2013.01); *A63F 2300/5546* (2013.01)

(58) Field of Classification Search
CPC ........ A63F 2300/5506; A63F 2300/609; A63F 13/61; A63F 13/85; A63F 2300/57; A63F 13/10; A63F 13/12; A63F 13/30; A63F 13/34; G06Q 30/0209
See application file for complete search history.

(56) References Cited

U.S. PATENT DOCUMENTS

| | | | |
|---|---|---|---|
| 2007/0105627 A1* | 5/2007 | Campbell | G06F 8/60 463/40 |
| 2007/0243928 A1 | 10/2007 | Iddings | |
| 2008/0113809 A1 | 5/2008 | David et al. | |
| 2012/0015742 A1 | 1/2012 | Vanbragt et al. | |
| 2013/0005438 A1 | 1/2013 | Ocko et al. | |
| 2013/0079134 A1 | 3/2013 | Walker et al. | |

FOREIGN PATENT DOCUMENTS

| | | |
|---|---|---|
| JP | 2011-083597 A | 4/2011 |
| JP | 2014-004164 A | 1/2014 |
| JP | 2014-006888 A | 1/2014 |
| JP | 2014-184321 A | 10/2014 |
| KR | 10-2004-0018576 A | 3/2004 |
| KR | 10-2004-0092208 A | 11/2004 |
| KR | 10-2006-0112723 A | 11/2006 |
| KR | 10-2009-0095283 A | 9/2009 |
| KR | 10-2010-0133180 A | 12/2010 |

OTHER PUBLICATIONS

Office Action dated Apr. 29, 2015, issued in Korean Application No. 10-2015-7015439 (with English translation).
"Enjoy mainstream games like WE RULE of iPhone users" posted at the website of Tistory, Apr. 25, 2010, <http://ilogin.tistory.com/124>.
Office Action dated Jul. 1, 2016. issued in Chinese Application No. 201380063242.9 (with English translation).
Extended European Search Report dated Sep. 2, 2016 in European Patent Application No. 13 86 9538.2.
Office Action dated Feb. 4, 2017 in Chinese Application No. 201380063242.9 (with English translation).
Office Action dated Jun. 16, 2017 in European Application No. 13 869 538.2.
Office Action dated Jan. 31, 2018 in European Application No. 13869538.2, 12 pages.
Office Action dated Mar. 5, 2018 in corresponding Korean Application No. 10-2016-7035658 (with English translation), 9 pages.
Office Action dated Apr. 3, 2018 in Chinese Application No. 201380063242.9 (with English translation).
Decision to Refuse a European Patent Application dated Jul. 31, 2018 in European Application No. 13 869 538.2, 25 pages.
Office Action dated Sep. 4, 2018 in Chinese Application No. 201380063242.9 with English translation, 24 pages.
Extended European Search Report issued in corresponding European Application No. 18199466.6 dated Feb. 12, 2019.
Notification of Publication Number issued in corresponding European Application No. 18199466.6 dated Feb. 13, 2019.

\* cited by examiner

Fig. 3

| EXISTING USER ID | INTRODUCTION CODE | NEW USER ID |
|---|---|---|
| U0001 | IV0001 | U3697 |
| | | U2393 |
| | | U0104 |
| | | U1054 |
| U0002 | --- | --- |
| U0003 | IV0002 | --- |
| ... | ... | ... |

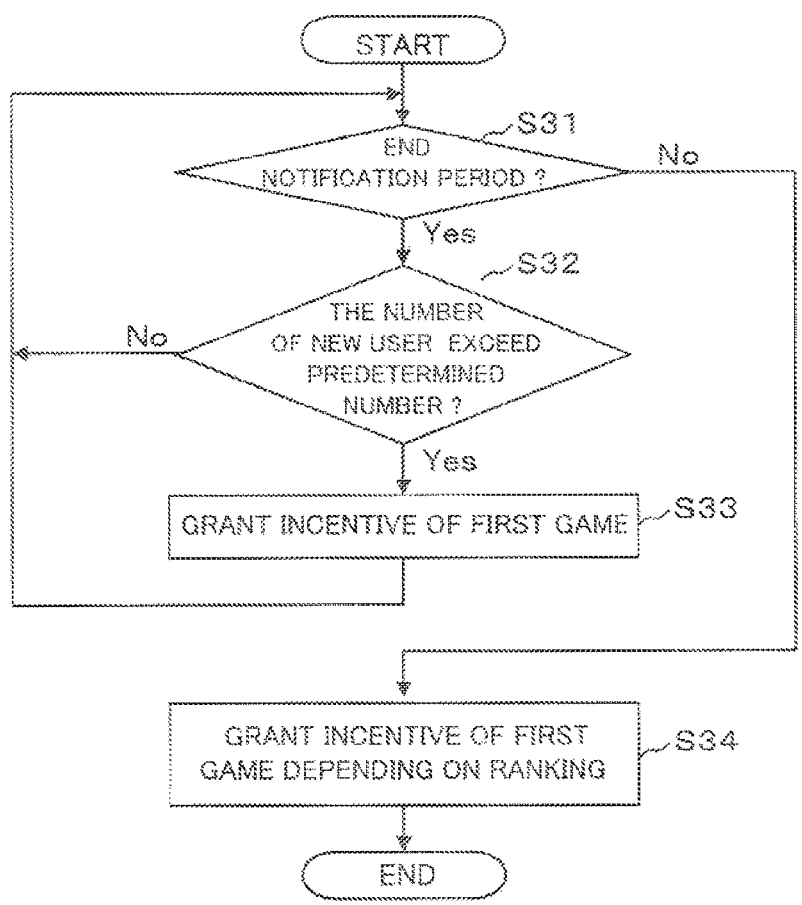

IN-GAME INCENTIVE GRANTING DEVICE AND PROGRAM FOR INCENTIVE GRANTING

CROSS-REFERENCE TO RELATED APPLICATIONS

This application is a continuation of and is based upon and claims the benefit of priority under 35 U.S.C. § 120 from U.S. application Ser. No. 15/225,367, filed Aug. 1, 2016, which is a continuation of U.S. application Ser. No. 14/655,917, filed Jun. 26, 2015 (now U.S. Pat. No. 9,440,149), which is a national stage application of International Application No. PCT/JP2013/078780, filed Oct. 24, 2013, and claims the benefit of priority under 35 U.S.C. § 119 of Japanese Application No. 2012-284152, filed Dec. 27, 2012; the entire contents of each of which are incorporated herein by reference.

TECHNICAL FIELD

The present invention relates to an in-game incentive granting device and a program for incentive granting, and more particularly to a technique for granting a predetermined incentive to an existing user introducing a game to a new user.

BACKGROUND ART

In order to increase the number of users utilizing a game, conventionally, various devices are proposed. As a typical example, it is known that a point, an item or the like to be used in a certain game is granted as a bonus to an existing user introducing a new user of the game (for example, see Patent Document 1).

Referring to the Patent Document 1, an introduction relationship (a parent-child relationship) between users, for example, a user B and a user C who are introduced by a user A and start a game, a user D who is further introduced by the user B and starts the game, and the like is managed over a plurality of generations. A bonus point corresponding to game results of a child user and a grandchild user is continuously granted to a parent user.

Referring to the Patent Document 1, moreover, an existing user capable of introducing a game to a new user and acquiring a bonus point is limited to only a user who satisfies a predetermined condition in the game. In other words, an introduction code to be used for introducing a game to another new user is issued to only an existing user satisfying a predetermined condition in the game.

According to the Patent Document 1 having such a structure, the existing user is given a granting point corresponding to a point acquired through the game by a new user introduced by the existing user himself (herself). Moreover, a granting point corresponding to the acquired point is continuously given to the existing user as long as the new user introduced by the existing user himself (herself) continues a custom for playing the game. For this reason, the point granting is not carried out only once but continuously through the introduction by the existing user.

Accordingly, the existing user positively introduce friends or acquaintances in order to acquire a granting point, thereby producing a higher game result. Therefore, it is possible to increase an acquirement efficiency of a new user through an introduction by the existing user. Moreover, the new user introduced by the existing user and starting the game also introduces his (her) friends or acquaintances soon in order to acquire a granting point, thereby generating a higher game result. Therefore, the number of the new users can be increased serially.

Patent Document 1: Japanese Laid-Open Patent Publication No. 2011-83597

The prior art described in the Patent Document 1 provides a mechanism for introducing, to another user, a game (an existing game) that has already been played by the existing user, thereby increasing the number of new users for the existing game. Moreover, the bonus point to be granted to the existing user through the introduction relates to the existing game. For this reason, according to the prior art described in the Patent Document 1, it is possible to produce such advantages as to increase the number of the users for the existing game and to cause the existing user to concentrate on the existing game play more and more.

Referring to the prior art described in the Patent Document 1, however, there is a problem in that the number of the new users cannot be increased for a game other than the existing game. For example, a game maker or a game operating company desires to increase the number of users for a short period of time when a new game is released. If the technique described in the Patent Document 1 is applied to the existing game, however, the number of the users for the existing game can be simply increased and the number of the users for the new game cannot be increased.

If the technique described in the Patent Document 1 is applied to the new game, it is possible to expect the increase in the number of the new users to some degree through an introduction of another user by the new user for the new game. Immediately after the release of the new game, however, since many users are not aware of the release of the new game or are absorbed in the play of the existing game even though they are aware of the release, the number of initial users is increased with difficulty in some cases. Even if the technique described in the Patent Document 1 is applied in that case, it is hard to rapidly increase the number of the new users for the new game.

DISCLOSURE OF THE INVENTION

The present invention has been made in order to solve the problems and has an object to enable an effective increase in the number of new users for a game other than an existing game that has already been played by an existing user.

In order to attain the object, in the present invention, an existing user is notified of presence of a second game to promote execution of the second game during execution of an application of a first game through the existing user. Then, an introduction code to be used in an introduction of the second game to a new user is issued during execution of an application of the second game through the existing user receiving the notification. Thereafter, a predetermined incentive is granted to the first game which is being used by the existing user in relation to the fact that the new user downloads the application of the second game upon receipt of an introduction from the existing user.

According to the present invention having the structure described above, the existing user of the first game can know the presence of the second game by receiving the notification of the second game during the execution (play) of the first game. If the existing user receiving the notification executes the second game and introduces the second game to the new user, moreover, it is possible to obtain an incentive for the first game depending on the download of the second game through the new user. Therefore, the existing user positively introduce the second game to friends or acquaintances to aim at the acquirement of the incentive.

Consequently, if a new game is notified as the second game in the first game having many existing users immediately after release of the new game, for example, many existing users who have already played the first game can be made aware of the presence of the second game. It is possible to increase the number of new users for the second game through the fact that the many existing users themselves of the first game serve as the new users for the second game and that the friends or acquaintances receiving the introduction from the many existing users serve as the new users for the second game.

As described above, according to the present invention, it is possible to effectively increase the number of the new users for the game (the second game) other than the existing game (the first game) which has already been played by the existing user.

BRIEF DESCRIPTION OF THE DRAWINGS

FIG. 3 is a table showing an example of association information to be stored in an association storing unit according to the present embodiment.

FIG. 7 is a flowchart showing an example of the operation of the server according to the present embodiment, that is, an example of an operation of the server which is to be carried out for a notification period of the second game.

BEST MODE FOR CARRYING OUT THE INVENTION

Figure 1:
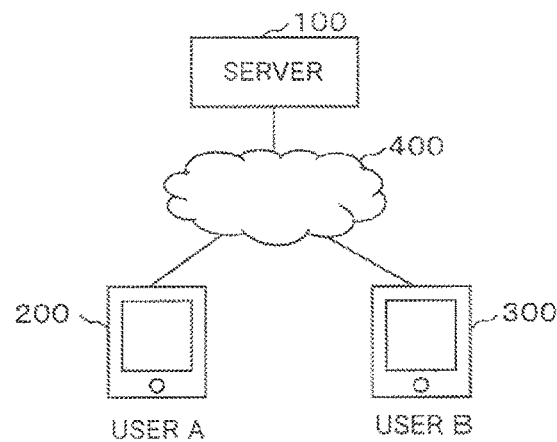
FIG. 1 is a diagram showing an example of a whole structure of a game system applying an in-game incentive granting device according to the present embodiment.

An embodiment of the present invention will be described below with reference to the drawings. FIG. 1 is a diagram showing an example of a whole structure of a game system applying an in-game incentive granting device according to the present embodiment. As shown in FIG. 1, the game system according to the present embodiment includes a server 100 corresponding to the incentive granting device, and portable terminals 200 and 300 installed with a game application (hereinafter referred to as a game app). The server 100 and the portable terminals 200 and 300 are connected to each other through a communication network 400 such as internet and can mutually carry out a data communication.

The portable terminals 200 and 300 can download and install a desirable game app from the server 100 and can execute the game app. Although the game app is mainly executed in the portable terminals 200 and 300, they are connected to the server 100 to carry out the data communication as necessary. For example, when a predetermined condition is cleared with advance of a game, a notice of the fact is given from the portable terminals 200 and 300 to the server 100. Upon receipt of the notification, the server 100 generates necessary data for taking various actions in the game app and transmits the data to the portable terminals 200 and 300. The actions include incentive granting which will be described below in detail.

In the portable terminals 200 and 300, a user can freely download and install a desirable game app from the server 100. In the following, for convenience of the description, it is assumed that the portable terminal 200 of a user A has already been installed with an app of a first game and the user A is executing (playing) the app of the first game. On the other hand, it is assumed that the portable terminal 300 of a user B is not installed with the app of the first game and an app of a second game is downloaded and installed upon receipt of an introduction from the user A.

Figure 2:
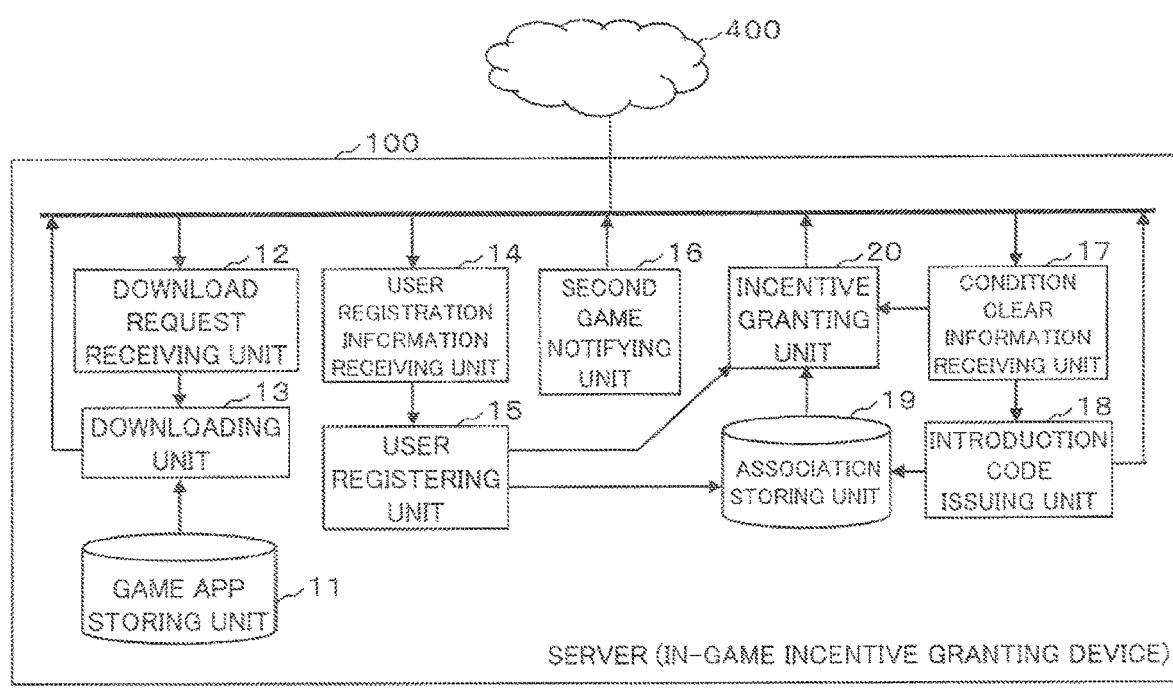
FIG. 2 is a block diagram showing an example of a functional structure of a server (the in-game incentive granting device) according to the present embodiment.

FIG. 2 is a block diagram showing an example of a functional structure of the server 100. As shown in FIG. 2, the server 100 according to the present embodiment includes, as the functional structure thereof, a game app storing unit 11, a download request receiving unit 12, a downloading unit 13, a user registration information receiving unit 14, a user registering unit 15, a second game notifying unit 16, a condition clear information receiving unit 17, an introduction code issuing unit 18, an association storing unit 19 and an incentive granting unit 20.

The functional structures 11 to 20 (excluding the game app storing unit 11 and the association storing unit 19) provided in the server 100 can also be implemented by all of a hardware structure, DSP (Digital Signal Processor) and software. For example, in the case of the implementation through the software, the functional structures are actually configured from a CPU, an RAM, an ROM and the like in a computer and can be implemented by an operation of a program for incentive granting stored in the RAM or the ROM. Moreover, the program for incentive granting may be stored in another recording medium such as a hard disk or a semiconductor memory.

The game app storing unit 11 stores various game apps to be downloaded into the portable terminals 200 and 300. In the present embodiment, it is assumed that the game app storing unit 11 stores at least the app of the first game and that of the second game.

The download request receiving unit 12 receives a download request for a game app transmitted via a download site from the portable terminals 200 and 300. The download request includes identification information of the game app requested to be downloaded.

The downloading unit 13 acquires the requested game app from the game app storing unit 11 based on the download request received by the download request receiving unit 12 and downloads the game app into the portable terminals 200 and 300 which are requesting sources. As described above, in the present embodiment, it is assumed that the app of the first game has already been downloaded into the portable terminal 200 of the user A.

Moreover, the downloading unit 13 downloads the app of the second game into the portable terminal 200 of the user A receiving a notification of the second game during execution of the first game in response to the download request given from the user A.

Furthermore, the downloading unit 13 downloads the app of the second game into the portable terminal 300 of the user B receiving the introduction of the second game from the user A in response to a request given from the user B.

The user registration information receiving unit 14 receives user registration information of the game apps transmitted from the portable terminals 200 and 300 via a user registration screen. The user registration information includes at least user identification information and game app identification information. Moreover, user registration information about the app of the second game downloaded into the portable terminal 300 by the user B upon receipt of the introduction from the user A further includes an introduction code of the user A (which will be described below in detail).

The user registering unit 15 stores association information in the association storing unit 19 by using the user registration information received by the user registration information receiving unit 14. The details of the association information will be described below.

The second game notifying unit 16 gives the user A (the existing user) of the first game a notification of the presence of the second game, thereby promoting the execution of the second game during the execution of the app of the first game by the existing user A. In other words, the second game notifying unit 16 generates necessary notification data for displaying a notification page of the second game on the portable terminal 200 and necessary download site data for displaying a page of a download site of the second game on the portable terminal 200 and transmits the data to the portable terminal 200 as a mode for an action to be taken in the app of the first game.

The notification data may be data itself on the notification page of the second game or link data to the notification page. In the case in which the notification data is the data itself on the notification page, the portable terminal 200 displays the notification page based on the notification data when the notification data is transmitted from the server 100. On the other hand, in the case in which the notification data is the link data to the notification page, the portable terminal 200 first displays the link data thereon. When the user designates the link, then, the notification page of the second game is displayed on the portable terminal 200. The notification page may be of a banner type for display using a part of a screen or a full screen type for display using a full screen.

The notification of the second game is given during the execution of the first game by the user A. Through a mechanism for logging in to the server 100 from the portable terminal 200 at start of the first game, it is possible to grasp whether the user A is executing the first game or not. In other words, the server 100 can grasp that the user A is executing the app of the first game by transmission of identification information of the user A and that of the first game to the server 100 when log in of the first game is carried out. To the contrary, when log off of the first game is carried out, the server 100 can grasp that the user A is not executing (has ended) the app of the first game.

It is possible to optionally set a timing for displaying the notification page of the second game during the execution of the first game. For example, it is possible to set the display timing as a timing in which a predetermined time passes after the log in.

Alternatively, it is also possible to set the display timing as a time that a predetermined condition set into the first game is cleared (a notification of the condition clear is transmitted from the portable terminal 200 to the server 100). The timing described above is only illustrative and the other timings may be employed.

The notification page of the second game describes that a predetermined incentive (a point, an item or the like) is given to the first game when the second game is introduced to friends or acquaintances in addition to a sentence and an image introducing the content of the second game. In the case in which the existing user A of the first game sees the notification page and takes an interest therein, he (she) transmits the download request of the second game from the portable terminal 200 to the server 100 via the download site, thereby enabling the app of the second game to be downloaded from the server 100 and installed into the portable terminal 200.

Preferably, a link to the download site is provided on the notification page to enable the user to make a transition to the download site by designating the link on the notification page. In this case, the second game notifying unit 16 transmits the download site data to the portable terminal 200 depending on the designation of the link on the notification page. The portable terminal 200 displays the page of the download site based on download site data transmitted from the server 100.

The condition clear information receiving unit 17 receives condition clear information for giving a notification that a predetermined condition is cleared in the second game. Herein, some methods can be supposed as a method of indicating which user cleared the predetermined condition in the second game. For example, it is possible to apply a method of causing the condition clear information to include the identification information of the second game and the identification information of the user playing the second game. Alternatively, it is also possible to recognize which user cleared the predetermined condition in the second game by using log in information to the second game for the user. In the latter case, it is not necessary to cause the condition clear information to include the identification information of the second game and that of the user.

The predetermined condition can be set optionally. For example, it is possible to set, as the predetermined condition, a breakthrough of a tutorial to be a mode for learning a basic operation of a game while manipulating a character in the second game. Alternatively, it is also possible to set, as the predetermined condition, that a predetermined item to be used in the second game is got or to set, as the predetermined condition, that the point acquired in the second game reaches a predetermined value. The conditions described above are only illustrative and the other contents may be set to be the predetermined condition.

The introduction code issuing unit 18 issues an introduction code to be used in the introduction of the second game to a new user (that is the user B in the case of FIG. 1 and actually includes other users) during the execution of the app of the second game by the existing user A of the first game. The introduction code issuing unit 18 stores the issued introduction code in association with the identification information of the existing user A for the association storing unit 19.

When the existing user A performs user registration for the first game, the identification information of the existing user A is stored in the association storing unit 19 by the user registering unit 15. The introduction code issuing unit 18 stores the introduction code issued to the existing user A for the association storing unit 19 in association with the identification information of the existing user A which has already been stored in the association storing unit 19.

Moreover, the introduction code issuing unit 18 transmits the issued introduction code to the portable terminal 200 of the existing user A. The existing user A introduces the second game to his (her) own friends, acquaintances or the like by using the introduction code. A timing for issuing the introduction code during the execution of the second game can be set optionally. For example, the timing can be set to be the time that the predetermined condition set into the second game is cleared (the condition clear information receiving unit 17 receives condition clear information from the portable terminal 200). In other words, the introduction code issuing unit 18 issues an introduction code on the condition that the predetermined condition is cleared in the second game used newly by the existing user A upon receipt of the notification given from the game notifying unit 16.

It is also possible to optionally set the predetermined condition in this case. For example, it is possible to set the breakthrough of the tutorial of the second game as the predetermined condition. Alternatively, it is also possible to set, as the predetermined condition, that a predetermined item to be used in the second game is got or to set, as the predetermined condition, that a point acquired in the second game reaches a predetermined value. The conditions described above are only illustrative and the other contents may be set to be the predetermined conditions.

Moreover, an introducing method to be executed by the existing user A using the issued introduction code is also optional. For example, the second game may be introduced through a social networking site (SNS) or by an E-mail. In the case in which the user B receiving the introduction of the second game from the existing user A of the first game takes an interest in the introduction, he (she) transmits a download request of the second game from the portable terminal 300 to the server 100 via the download site, thereby enabling the app of the second game to be downloaded from the server 100 and to be installed in the portable terminal 300.

The user B who downloaded the app of the second game also performs the user registration of the second game through a user registration screen. At this time, information to be transmitted as user registration information to the server 100 includes the identification information of the user B, the identification information of the second game and the introduction code of the user A who introduced the second game. The user registering unit 15 of the server 100 stores association information in the association storing unit 19 by using these user registration information.

Herein, the identification information of the existing user A of the first game and the introduction code of the existing user A have already been stored in the association storing unit 19 in association with each other. The user registering unit 15 stores the identification information of the new user B therein for the association storing unit 19 in association with the identification information of the existing user A corresponding to the introduction code which has already been stored in the association storing unit 19.

Consequently, the association storing unit 19 stores the identification information of the existing user A of the first game, the introduction code issued to the existing user A of the first game, and the identification information of the new user B who downloaded the app of the second game by using the introduction code in association with each other. As described above, the identification information of the existing user A and that of the new user B are stored in the association storing unit 19 by the user registering unit 15 in respective user registering operations. Moreover, the introduction code is stored in the association storing unit 19 by the introduction code issuing unit 18 when it is issued. Thus, recording means according to the present invention is configured from the user registering unit 15 and the introduction code issuing unit 18.

FIG. 3 is a table showing an example of the association information related to the first game to be stored in the association storing unit 19. As shown in FIG. 3, the association information has, as items, the identification information of the existing user of the first game, the introduction code issued to the existing user and the identification information of the new user. Although only the user A is present as the existing user and only the user B is present as the new user in the example of FIG. 1, a plurality of users including the existing user and the new user is actually present. In the example shown in FIG. 3, there are shown information about three people as the existing users for the first game.

In an initial state in which the existing user downloads only the app of the first game, only the identification information of the existing user is stored in the association storing unit 19 and no information is stored in items for the introduction code and the identification information of the new user (see a record in which the identification information of the existing user is "U0002").

On the other hand, when the existing user A downloads the app of the second game upon receipt of the notification of the second game through the second game notifying unit 16 and the existing user clears the predetermined condition during the execution of the second game (the breakthrough of the tutorial or the like), this is transmitted as the condition clear information from the portable terminal 200 to the server 100 and is received by the condition clear information receiving unit 17. When the introduction code is issued by the introduction code issuing unit 18 upon receipt of this, the introduction code is stored in association with the identification information of the existing user (see a record in which the identification information of the existing user is "U0003").

When the new user who downloaded the app of the second game upon receipt of the introduction from the existing user carries out user registration related to the app of the second game, furthermore, the identification information of the new user, the identification information of the second game and the introduction code of the existing user are received by the user registration information receiving unit 14. Then, the identification information of the new user is stored in the association storing unit 19 in association with the identification information of the existing user corresponding to the introduction code of the existing user by the user registering unit 15 (see a record in which the identification information of the existing user is "U0001").

The user registration related to the app of the second game through the new user is sequentially carried out according to convenience of the new user. For this reason, the identification information of the new user which has been subjected to the user registration is sequentially stored in the association storing unit 19. In the example of FIG. 3, identification information about four new users are stored in the association storing unit 19 in association with the existing user having the identification information of "U0001". Description will be given on the assumption that the existing user having the identification information of "U0001" is set to be the user A and the new users who downloaded the app of the second game upon receipt of the introduction from the user A are set to be the users B to E.

The incentive granting unit 20 refers to the association information stored in the association storing unit 19 to grant a predetermined incentive (a point, an item or the like) to the first game which is being used by the existing user A in relation to the fact that the new users B to E download the app of the second game upon receipt of the introduction from the existing user A (accurately, the user registration of the second game is carried out).

More specifically, the incentive granting unit 20 sequentially grants an incentive to the first game of the existing user A upon receipt of a notification of execution of the user registration from the user registering unit 15 every time the four new users B to E download the app of the second game upon receipt of the introduction from the existing user A and execute the user registration of the second game.

In the present embodiment, thus, if the existing user A of the first game introduces the notified second game to the new users B to E and the new users B to E download the app of the second game to carry out the user registration, the existing user A can obtain an incentive for the first game that he (she) originally plays by choice. Accordingly, the existing user A positively introduces the second game to friends or acquaintances in order to aim at acquirement of the incentive.

Consequently, if a new game is notified as the second game in the first game with the presence of many existing users immediately after release of the new game, for example, it is possible to effectively increase the number of new users for the second game through an introduction from many existing users which have already played the first game.

In the present embodiment, moreover, there is employed a mechanism in which the introduction code is issued by the introduction code issuing unit 18 when the existing user A downloads and executes the app of the notified second game by himself (herself) and the predetermined condition is cleared. For this reason, the existing user A himself (herself) serves as the new user of the second game on the assumption that the existing user A of the first game introduces the second game to the new users B to E. Also from this viewpoint, it is possible to increase the number of the new users for the second game.

A case in which the incentive granting unit 20 grants the incentive is not restricted to the case described above. In other words, the incentive may be granted in the following case in addition to the case described above.

As a first additional case, the incentive granting unit 20 refers to the association information stored in the association storing unit 19 to grant a predetermined incentive to the second game used newly by the existing user A upon receipt of a notification given from the second game notifying unit 16 in relation to the fact that the new users B to E download the app of the second game upon receipt of the introduction from the existing user A (the user registration is carried out).

As described above, the existing user A himself (herself) should be the new user of the second game to receive the issuance of the introduction code in order to acquire the incentive for the first game through the introduction of the second game to the new users B to E by the existing user A of the first game. In the present embodiment, if the predetermined condition of the breakthrough of the tutorial is simply cleared in relation to the second game, it is possible to receive the issuance of the introduction code. Even if the existing user A does not continue the play of the second game, then, it is possible to steadily introduce the second game to the new user.

For this reason, in the case in which the existing user A is absorbed in the first game or the case in which the existing user A does not originally take a great interest in a category of the second game, it is unknown whether the existing user A continuously plays the second game also after the acquirement of the incentive for the first game. On the other hand, if the incentive for the second game is also granted as described above, the existing user A can also be motivated to continuously play the second game.

In many cases, the user tends to play a game in a category adapted to his (her) own interests and tastes by choice. For example, a user who likes a battle game plays the battle game by choice, and some users do not play games in other categories at all in an extreme case. However, this is often so-called "prejudice". In order to increase the number of the users for the games, it is desired that the user having the prejudice should also be acquired as a new user.

On the other hand, if the incentive for the second game is granted to the existing user A of the first game as in the first additional case, the existing user A can be motivated to continuously play the second game in a different category from the category of the first game that the existing user A plays by choice. Consequently, it is possible to increase a possibility that the existing user A might be acquired as a new user having a new category added to a taste.

As a second additional case, moreover, the incentive granting unit 20 refers to the association information stored in the association storing unit 19 to grant a predetermined incentive to at least one of the first game and the second game every time the number of new users who downloaded the app of the second game (carrying out the user registration) upon receipt of the introduction from the existing user exceeds a predetermined number.

As a third additional case, furthermore, the incentive granting unit 20 refers to the association information stored in the association storing unit 19 to rank the existing user in descending order of the number of the new users who downloaded the app of the second game (carrying out the user registration) upon receipt of the introduction from the existing user when a certain notification period is ended by the second game notifying unit 16, thereby granting a predetermined incentive to at least one of the first game and the second game depending on the ranking. For example, the incentive granting unit 20 grants an incentive to top ten people in the ranking. At this time, the contents of the incentive may be varied depending on the ranking.

When the incentive is further granted in the second additional case or the third additional case so that the number of the new users downloading the app of the second game upon receipt of the introduction from the existing user A is increased more greatly, thus, a large number of incentives are granted to the first game of the existing user A. Consequently, a great motivation for introducing the second game to the new user can be granted to the existing user A. Therefore, it is possible to effectively increase the number of the new users for the second game through the introduction from the existing user A.

As a fourth additional case, furthermore, the incentive granting unit 20 refers to the association information stored in the association storing unit 19 to grant a predetermined incentive to the first game which is being used by the existing user A in relation to the fact that the existing user A clears a predetermined condition such as a breakthrough of a tutorial in the second game used newly by the existing user A upon receipt of a notification given from the second game notifying unit 16.

Although the introduction code is issued by the introduction code issuing unit 18 when the existing user A clears the predetermined condition in the second game as described above, the incentive for the first game is simultaneously granted at this time according to the fourth additional case. Consequently, it is possible to give the existing user A a motivation for the existing user A to clear a necessary condition for obtaining the introduction code.

Although the description has been given to the example in which the incentive is given to the existing user A of the first game when the new users B to E carry out the user registration for the app of the second game which is downloaded in the embodiment, the present invention is not restricted thereto. For example, the incentive granting unit 20 may grant a predetermined incentive to at least one of the first game and the second game which are being used by the existing user A on a condition that the new users B to E download the app of the second game upon receipt of the introduction from the existing user A, and furthermore, the new users B to E clear the predetermined condition in the second game.

Figure 4:
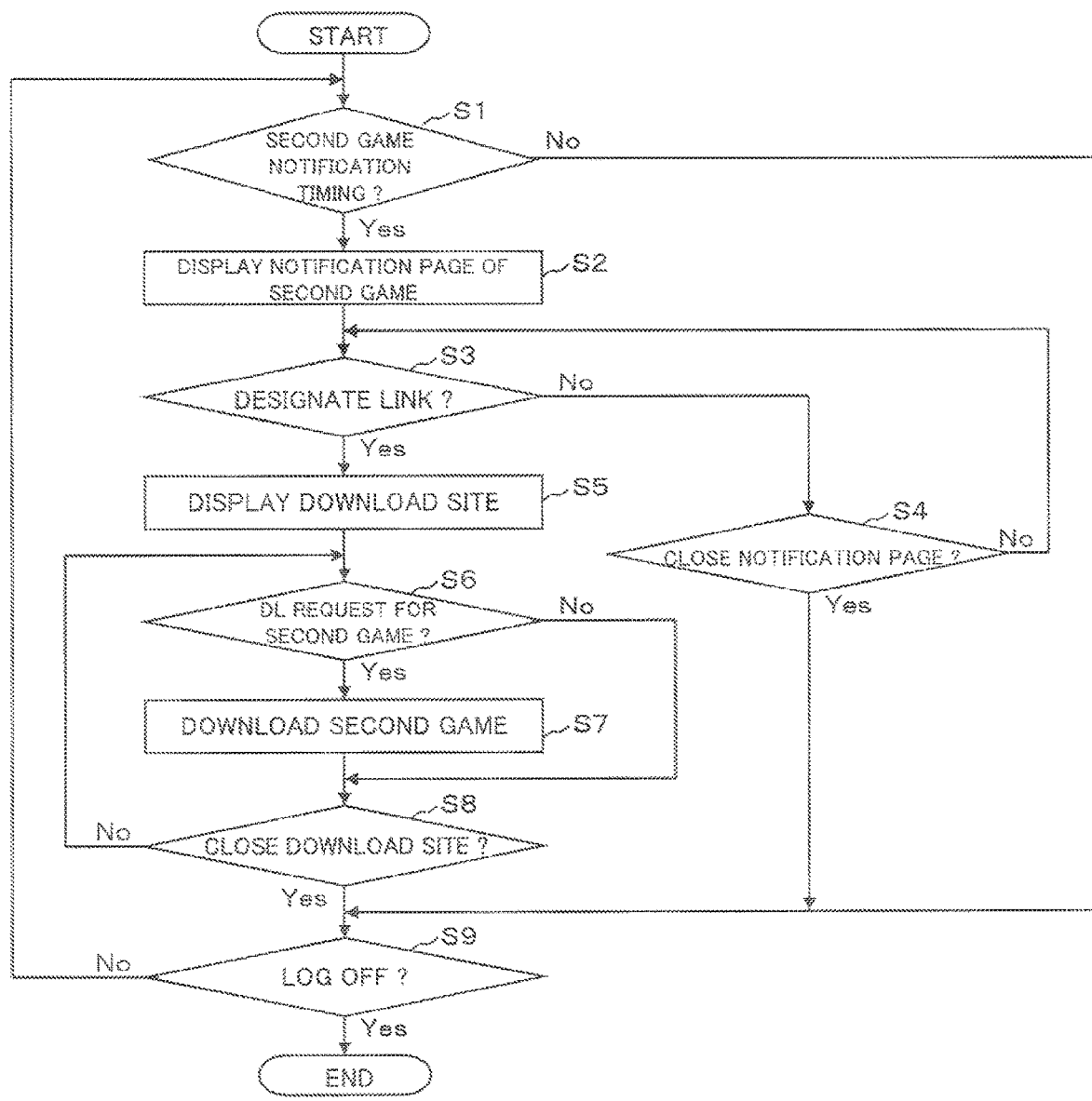
FIG. 4 is a flowchart showing an example of an operation of the server according to the present embodiment, that is, an example of an operation in execution of a notification of a second game when an existing user performs a first game.

FIGS. 4 to 7 are flowcharts showing an example of an operation in the server 100 (the in-game incentive granting device) according to the present embodiment which is configured as described above. FIG. 4 is a flowchart showing an example of an operation for giving a notification of the second game when the existing user A is executing the first game. The flowchart shown in FIG. 4 is started when the existing user A logs in to the server 100 from the portable terminal 200 in the execution of the first game.

First of all, the second game notifying unit 16 decides whether a timing for displaying the notification page of the second game is reached during the execution of the first game or not (Step S1). If the timing for displaying the notification page has not been reached yet, the processing makes a transition to Step S9. On the other hand, if the display timing for the notification page is reached, the second game notifying unit 16 causes the portable terminal 200 to display the notification page of the second game in order to give a notification of the presence of the second game to the existing user A of the first game, thereby promoting the execution of the second game (Step S2).

Next, the second game notifying unit 16 decides whether a link to the download site provided on the notification page is designated by the manipulation of the existing user A or not (Step S3). If the link is not designated, the second game notifying unit 16 decides whether the notification page is closed by the manipulation of the existing user A or not (Step S4). If the notification page is not closed, the processing returns to the Step S3. On the other hand, if the notification page is closed, the processing makes a transition to Step S9.

If it is decided that the link is designated in the Step S3, the second game notifying unit 16 causes the portable terminal 200 to display the download site of the game app thereon (Step S5). Herein, the download request receiving unit 12 decides whether the download of the app of the second game is designated on the download site or not, that is, a download request for the app of the second game is received from the portable terminal 200 or not (Step S6).

If the download request for the app of the second game is received by the download request receiving unit 12, the downloading unit 13 acquires the app of the second game from the game app storing unit 11 and then downloads the app into the portable terminal 200 (Step S7). Thereafter, the second game notifying unit 16 decides whether the download site is closed by the manipulation of the existing user A or not (Step S8). If it is decided that the download request for the app of the second game is not generated in the Step S6, the processing makes a transition to the Step S8.

If it is decided that the download site is not closed in the Step S8, the processing returns to the Step S6. On the other hand, if it is decided that the download site is closed, the server 100 decides whether a log off processing related to the first game is carried out through the portable terminal 200 or not (Step S9). Herein, if the log off processing is not carried out, the processing returns to the Step S1. On the other hand, if the log off processing is carried out, the processing of the flowchart shown in FIG. 4 is ended.

Figure 5:
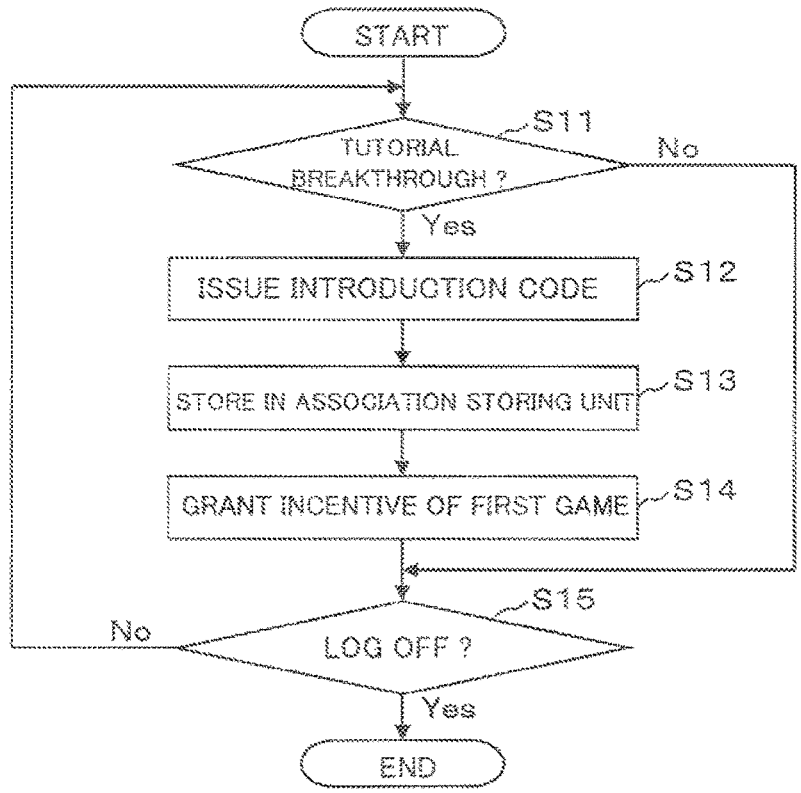
FIG. 5 is a flowchart showing an example of the operation of the server according to the present embodiment, that is, an example of an operation in execution of an application of the second game downloaded by the existing user.

FIG. 5 is a flowchart showing an example of an operation to be carried out when the existing user A is executing the app of the second game which is downloaded in the Step S7. The flowchart shown in FIG. 5 is started when the existing user A logs in to the server 100 from the portable terminal 200 in the execution of the second game.

The condition clear information receiving unit 17 decides whether condition clear information for giving a notification of the breakthrough of the tutorial by the existing user A in the second game is received or not (Step S11). If the condition clear information is not received, the processing makes a transition to Step S15.

On the other hand, if the condition clear information is received by the condition clear information receiving unit 17, the introduction code issuing unit 18 issues the introduction code of the existing user A and transmits the introduction code to the portable terminal 200 (Step S12). Moreover, the introduction code issuing unit 18 stores the issued introduction code in association with the identification information of the existing user A for the association storing unit 19 (Step S13).

Moreover, the incentive granting unit 20 refers to the association information stored in the association storing unit 19 to grant a predetermined incentive to the first game which is being used by the existing user A in relation to the breakthrough of the tutorial in the second game by the existing user A (Step S14).

Then, the server 100 decides whether the log off processing related to the second game is carried out through the portable terminal 200 or not (Step S15). Herein, if the log off processing is not carried out, the processing returns to the Step S11. On the other hand, if the log off processing is carried out, the processing of the flowchart shown in FIG. 5 is ended.

Figure 6:
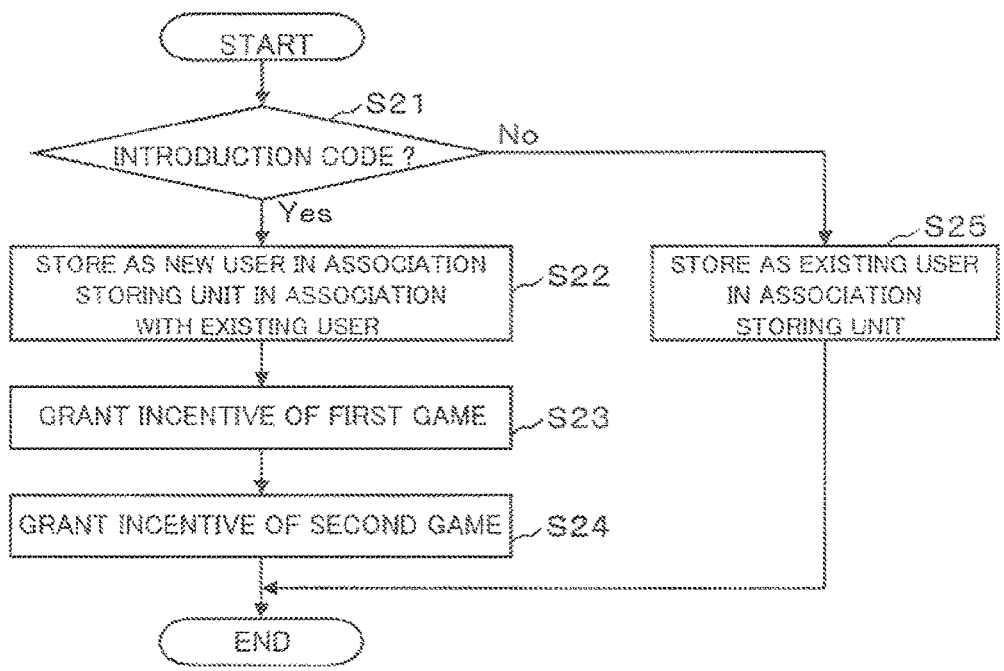
FIG. 6 is a flowchart showing an example of the operation of the server according to the present embodiment, that is, an example of an operation in execution of user registration by a new user downloading the second game upon receipt of an introduction from the existing user.

FIG. 6 is a flowchart showing an example of an operation to be carried out when the new users B to E who downloaded the second game upon receipt of the introduction from the existing user A perform the user registration of the second game. The flowchart shown in FIG. 6 is started when the user registration information receiving unit 14 receives user registration information.

The user registering unit 15 decides whether the introduction code of the existing user A is included in the user registration information received by the user registration information receiving unit 14 or not (Step S21). If the introduction code of the exiting user A is included, the user registering unit 15 stores the identification information of the new user for the association storing unit 19 in association with the identification information of the existing user A corresponding to the introduction code stored in the association storing unit 19 (which is the same as that received by the user registration information receiving unit 14) (Step S22). Moreover, the user registering unit 15 notifies the incentive granting unit 20 of the fact that the identification information of the new user is registered in association with the identification information of the existing user A.

Upon receipt of the notification, the incentive granting unit 20 refers to the association information stored in the association storing unit 19 to grant a predetermined incentive to the first game which is being used by the existing user A in relation to the fact that the new user receiving the introduction from the existing user A downloads the app of the second game and performs the user registration (Step S23), and furthermore, to grant a predetermined incentive to the second game used newly by the existing user A (Step S24). Consequently, the processing of the flowchart shown in FIG. 6 is ended.

If it is decided that the introduction code of the existing user A is not included in the user registration information in the Step S21 (that is, the new user uniquely downloads the second game and performs the user registration without the introduction from the existing user A), the user registering unit 15 stores the new user as the existing user of the second game for the association storing unit 19 (Step S25). In this case, the processing in the flowchart shown in FIG. 6 is thus ended.

As described above, it is also possible to grant predetermined incentives to the first game and the second game on the condition that the new users B to E clear a predetermined condition in the second game without granting the incentive to the existing user A by simply performing the user registration for the app of the second game downloaded by the new users B to E.

FIG. 7 is a flowchart showing an example of the operation of the server 100 which is to be carried out for the notification period of the second game. The flowchart shown in FIG. 7 is started when an operator of the server 100 sets a certain notification period to the second game notifying unit 16 and the incentive granting unit 20 to give an instruction for starting the notification of the second game, for example.

The incentive granting unit 20 decides whether the certain notification period thus set is ended or not (Step S31). If the notification period has not been ended yet, the incentive granting unit 20 refers to the association information stored in the association storing unit 19 to decide whether the number of new users who downloaded the app of the second game (who performed the user registration) exceeds a predetermined number for each existing user stored in the association storing unit 19 or not (Step S32).

If there is an existing user for whom the number of new users exceeds a predetermined number, the incentive granting unit 20 grants a predetermined incentive to the first game of the existing user (Step S33). Then, the processing returns to the Step S31. On the other hand, if it is decided that there is no existing user for whom the number of new users exceeds the predetermined number in the Step S32, the processing returns to the Step S31.

Thus, the processing of the Steps S31 to S33 is usually executed in a loop. For this reason, the association information in the association storing unit 19 is updated at any time during the processing. Every time the number of the new users who downloaded the app of the second game upon receipt of an introduction from a certain existing user (who performed the user registration) exceeds the predetermined number, a predetermined incentive is granted to the first game of the existing user.

If it is decided that the certain notification period is ended in the Step S31, moreover, the incentive granting unit 20 refers to the association information stored in the association storing unit 19 to rank the existing user in descending order of the number of the new users, thereby granting a predetermined incentive to the first game of the existing user depending on the ranking, for example (Step S34). Consequently, the processing of the flowchart shown in FIG. 7 is ended.

As described above in detail, according to the present embodiment, the existing user of the first game can know the presence of the second game by receiving the notification of the second game during the execution (play) of the first game. If the existing user executes the second game which is notified and introduces the new user and the new user thus introduced downloads the second game to perform the user registration, moreover, the existing user can obtain the incentive for the first game. Thus, the existing user of the first game positively introduce the second game to friends or acquaintances to aim at the acquirement of the incentive.

Consequently, by giving a notification of a new game as a second game in the first game with presence of many existing users immediately after release of the new game, for example, the many existing users playing the first game can be made aware of the presence of the second game. Thus, it is possible to increase the number of the new users of the second game through the fact that the many existing users themselves for the first game serve as the new users for the second game and the friends or acquaintances introduced by the many existing users serve as the new users for the second game.

Although the description has been given to the example in which the function of the second game notifying unit 16 is provided in the server 100 in the embodiment, the present invention is not restricted thereto. For example, it is also possible to employ such a mechanism as to give the notification of the second game as the function of the app of the first game (that is, as an application program of the first game). However, the degree of freedom of the notification of the second game is reduced in this case. As described in the embodiment, therefore, it is preferable that the second game notifying unit 16 should be provided in the server 100.

Although the description has been given to the structure in which the server 100 includes the game app storing unit 11, the download request receiving unit 12 and the downloading unit 13 in the embodiment, moreover, the present invention is not restricted thereto. For example, these may be provided in a separate download dedicated server (not shown) from the server 100.

The description has been given to the example in which the new users B to E input the introduction code of the existing user A issued by the introduction code issuing unit 18 in the user registration related to the second game in the embodiment, furthermore, the present invention is not restricted thereto. For example, the introduction code is issued by the introduction code issuing unit 18 when the existing user A breaks through the tutorial of the second game, and furthermore, URL of a dedicated download site for the existing user A is issued and is transmitted to the portable terminal 200 of the existing user A. The new users B to E introduced from the existing user A may download the app of the second game from the URL and embed the introduction code of the existing user A into the app of the second game which is downloaded.

In addition, the embodiment is only illustrative for concreteness to carry out the present invention and the technical scope of the present invention should not be thereby construed to be restrictive. In other words, the present invention can be carried out in various configurations without departing from the gist or main features thereof.

EXPLANATION OF DESIGNATION 14 user registration information receiving unit
15 user registering unit
16 second game notifying unit
17 condition clear information receiving unit
18 introduction code issuing unit
19 association storing unit
20 incentive granting unit
100 server
200, 300 portable terminal

The invention claimed is:

1. An in-game incentive granting device comprising:
    circuitry configured to
        notify an existing user of an application of a first game of presence of a second game to promote execution of the second game, a category of the first game being different from a category of the second game, by the existing user; and
        issue an introduction code to be used in an introduction of the second game to a new user of an application of the second game by the existing user; and
    one or more non-transitory computer-readable media configured to store identification information of the existing user, the introduction code issued by the circuitry and identification information of the new user who downloaded the application of the second game in association with each other,
    wherein the circuitry is configured to refer to association information stored in the one or more non-transitory computer-readable media to grant a predetermined incentive in the first game which is being used by the existing user when the new user downloads the application of the second game upon receipt of the introduction from the existing user.

2. A device separate from the in-game incentive granting device of claim 1, comprising:
    circuitry configured to
        receive a download request of the application of the second game from the existing user, and
        download the application of the second game to the existing user and the new user; and
    one or more non-transitory computer-readable media configured to store at least the application of the first game and the application of the second game.

3. The in-game incentive granting device of claim 1, wherein the circuitry is further configured to issue a Uniform Resource Locator (URL) identifier of a dedicated download site for the existing user and embed it in the introduction code, and
    wherein the new user downloads the application of the second game from the URL.

4. The in-game incentive granting device of claim 1, wherein the circuitry is configured to refer to the association information stored in the one or more non-transitory computer-readable media to further grant a predetermined incentive in the second game used newly by the existing user upon receipt of a notification that the new user downloaded the application of the second game upon receipt of the introduction from the existing user.

5. The in-game incentive granting device of claim 1, wherein the circuitry is configured to refer to the association information stored in the one or more non-transitory computer-readable media to grant a predetermined incentive to at least one of the first game and the second game which are being used by the existing user every time a number of the new users who downloaded the application of the second game upon receipt of the introduction from the existing user exceeds a predetermined number.

6. The in-game incentive granting device of claim 1, wherein the circuitry is configured to:
    issue a notification of the second game for a certain notification period;
    refer to the association information stored in the one or more non-transitory computer-readable media to rank the existing user in descending order of the number of the new users who downloaded the application of the second game upon receipt of the introduction from the existing user at an end of the certain notification period; and
    grant a predetermined incentive in at least one of the first game and the second game which are being used by the existing user based on the ranking.

7. The in-game incentive granting device of claim 1, wherein the circuitry is configured to refer to the association information stored in the one or more non-transitory computer-readable media to grant a predetermined incentive in the first game which is being used by the existing user in relation to a predetermined condition being cleared in the second game used newly by the existing user.

8. The in-game incentive granting device of claim 1, wherein the circuitry is configured to grant a predetermined incentive in at least one of the first game and the second game which are being used by the existing user when the new user downloads the application of the second game upon receipt of the introduction from the existing user, and the new user clears a predetermined condition in the second game.

9. An in-game incentive granting system comprising:
    circuitry configured to:
        receive a download request of an application of a second game from an existing user, and
        download the application of the second game to the existing user and a new user;
    the circuitry further configured to issue an introduction code to be used, by the existing user of an application of a first game, in an introduction of the second game to the new user, wherein a category of the second game being different from a category of the first game, and
    one or more non-transitory computer-readable media configured to:
        store at least the application of the first game and the application of the second game, and
        store identification information of the existing user, the introduction code issued by the circuitry, and identification information of the new user who downloaded the application of the second game in association with each other,
    wherein the circuitry is configured to refer to association information stored in the one or more non-transitory computer readable media to grant a predetermined incentive in the first game which is being used by the existing user when the new user downloads the application of the second game upon receipt of the introduction from the existing user.

* * * * *